(12) United States Patent
Stuttle et al.

(10) Patent No.: US 10,394,893 B2
(45) Date of Patent: *Aug. 27, 2019

(54) SOCIAL WHERE NEXT SUGGESTION

(71) Applicant: GOOGLE LLC, Mountain View, CA (US)

(72) Inventors: Matthew Nicholas Stuttle, Haywards Heath (GB); Sebastian Dörner, London (GB); Alexandra Gherghina, London (GB)

(73) Assignee: GOOGLE LLC, Mountain View, CA (US)

(*) Notice: Subject to any disclaimer, the term of this patent is extended or adjusted under 35 U.S.C. 154(b) by 261 days.

This patent is subject to a terminal disclaimer.

(21) Appl. No.: 15/402,023

(22) Filed: Jan. 9, 2017

(65) Prior Publication Data

US 2017/0116211 A1 Apr. 27, 2017

Related U.S. Application Data

(63) Continuation of application No. 14/054,708, filed on Oct. 15, 2013, now Pat. No. 9,558,242.

(51) Int. Cl.
*G06F 16/9032* (2019.01)
*G06F 16/248* (2019.01)
(Continued)

(52) U.S. Cl.
CPC ...... *G06F 16/90324* (2019.01); *G06F 16/248* (2019.01); *G06F 16/24578* (2019.01);
(Continued)

(58) Field of Classification Search
CPC .......... G06F 17/30598; G06F 17/3053; G06F 17/30554; G06F 17/3097; G06F 16/90324;
(Continued)

(56) References Cited

U.S. PATENT DOCUMENTS 6,529,136 B2 3/2003 Cao et al.
6,542,750 B2 4/2003 Hendrey et al.
(Continued)

FOREIGN PATENT DOCUMENTS

CN 101681469 A 3/2010
CN 102591911 A 7/2012
(Continued)

OTHER PUBLICATIONS

Kenteris, Michael, et al., "A Mobile Tourism Recommender System", ISCC 2010, Riccione, Italy, Jun. 22-25, 2010, pp. 840-845.*
(Continued)

*Primary Examiner* — Robert Stevens
(74) *Attorney, Agent, or Firm* — Johnson, Marcou & Isaacs, LLC

(57) ABSTRACT

A group recommendation provides end users in a social group a set of recommended destinations based on the combined personal preferences of the members of the social group. Members of a social group are identified using a combination of location based signals and social graph information in response to receiving a recommendation request. The group recommendation may be determined by combining the personal preferences associated with each member of the group into a master preference profile. Alternatively, the group recommendation may be determined by first calculating an individual recommendation list for each member of the social group and then calculating a composite score for each recommendation on the individual recommendation lists.

18 Claims, 5 Drawing Sheets

(51) Int. Cl.
*G06F 16/28* (2019.01)
*G06F 16/2457* (2019.01)
*G06Q 30/02* (2012.01)
*G06Q 50/00* (2012.01)

(52) U.S. Cl.
CPC ....... *G06F 16/285* (2019.01); *G06Q 30/0259* (2013.01); *G06Q 30/0261* (2013.01); *G06Q 30/0267* (2013.01); *G06Q 30/0269* (2013.01); *G06Q 50/01* (2013.01)

(58) Field of Classification Search
CPC ................ G06F 16/248; G06F 16/285; G06F 16/24578; G06Q 50/01; G06Q 30/0269; G06Q 30/0267; G06Q 30/0261; G06Q 30/0259
USPC ....................................................... 707/734
See application file for complete search history.

(56) References Cited

U.S. PATENT DOCUMENTS

| | | | |
|---|---|---|---|
| 6,618,593 B1 * | 9/2003 | Drutman | G08B 21/0222 455/456.3 |
| 7,593,740 B2 | 9/2009 | Crowley et al. | |
| 7,680,770 B1 * | 3/2010 | Buyukkokten | G06Q 10/10 340/573.1 |
| 8,073,461 B2 | 12/2011 | Altman et al. | |
| 8,091,032 B2 * | 1/2012 | Fischer | G06Q 10/02 707/748 |
| 8,095,432 B1 | 1/2012 | Berman et al. | |
| 8,230,016 B1 | 7/2012 | Pattan et al. | |
| 8,489,515 B2 * | 7/2013 | Mathur | G06F 17/30867 705/319 |
| 9,077,675 B2 | 7/2015 | Harris et al. | |
| 9,077,782 B2 | 7/2015 | Harris et al. | |
| 9,558,242 B2 | 1/2017 | Stuttle et al. | |
| 2006/0270419 A1 | 11/2006 | Crowley et al. | |
| 2007/0281689 A1 | 12/2007 | Altman et al. | |
| 2008/0132251 A1 | 6/2008 | Altman et al. | |
| 2009/0106040 A1 | 4/2009 | Jones | |
| 2009/0157613 A1 | 6/2009 | Strohmenger et al. | |
| 2009/0204600 A1 | 8/2009 | Kalik et al. | |
| 2009/0216435 A1 | 8/2009 | Zheng et al. | |
| 2010/0088649 A1 | 4/2010 | Kemp | |
| 2010/0153292 A1 * | 6/2010 | Zheng | G06Q 30/02 705/347 |
| 2010/0317392 A1 | 12/2010 | Davis et al. | |
| 2010/0325127 A1 | 12/2010 | Chaudhuri et al. | |
| 2011/0055725 A1 | 3/2011 | Folgner et al. | |
| 2011/0071881 A1 | 3/2011 | Zheng et al. | |
| 2011/0093458 A1 | 4/2011 | Zheng et al. | |
| 2011/0196863 A1 | 8/2011 | Marcucci et al. | |
| 2011/0270774 A1 | 11/2011 | Varshaysky et al. | |
| 2011/0276565 A1 | 11/2011 | Zheng et al. | |
| 2011/0307478 A1 | 12/2011 | Pinckney et al. | |
| 2012/0047147 A1 | 2/2012 | Redstone et al. | |
| 2012/0143859 A1 | 6/2012 | Lymperopoulos et al. | |
| 2012/0180107 A1 | 7/2012 | Gammill et al. | |
| 2012/0278387 A1 | 11/2012 | Garcia et al. | |
| 2013/0066821 A1 | 3/2013 | Moore et al. | |
| 2013/0073387 A1 | 3/2013 | Heath | |
| 2013/0097162 A1 | 4/2013 | Corcoran et al. | |
| 2013/0097246 A1 | 4/2013 | Zifroni et al. | |
| 2013/0237254 A1 | 9/2013 | Papakipos et al. | |
| 2014/0068459 A1 | 3/2014 | Graham | |
| 2014/0164511 A1 | 6/2014 | Williams et al. | |
| 2015/0106366 A1 | 4/2015 | Stuttle et al. | |

FOREIGN PATENT DOCUMENTS

| | | |
|---|---|---|
| CN | 103136303 A | 6/2013 |
| KR | 10-2012-0052683 A | 5/2012 |
| WO | 2005/114970 A2 | 12/2005 |
| WO | 2012/129771 A1 | 10/2012 |
| WO | 2015/057896 A1 | 4/2015 |

OTHER PUBLICATIONS

Symeonidis, Panagiotis, et al., "Geo-social Recommendations based on Incremental Tensor Reduction and Local Path Traversal", ACM LBSN '11, Chicago, IL, Nov. 1, 2011, pp. 89-96.*

Kofler, Christoph, et al., "Near2Me: An Authentic and Personalized Social Media-based Recommender for Travel Destinations", WSM '11, Scottsdale, AZ, Nov. 30, 2011, pp. 47-52.*

Allamanis, et al., "Evolution of a Location-based Online Social Network: Analysis and Models", IMC '12, Oct. 29-30, 2012, pp. 145-158.

Bao, et al., "Location-based and Preference Aware Recommendation Using Sparse Geo-Social Networking Data", ACM SIGSPATIAL GIS, Nov. 2012, pp. 199-208.

Chow, et al., "Towards Location-based Social Networking Services", ACM LBSN '10, Nov. 2, 2010, pp. 31-38.

Davidson, et al., "The You Tube Video Recommendation System", RecSys 2010, Sep. 26-30, 2010, pp. 293-296.

Guo, et al., "GroupMe: Supporting Group Formation with Mobile Sensing and Social Graph Mining", MobiQuitous 2012, Dec. 12-14, 2012, 12 pages.

Li, "Mining User Similarity Based on Location History", ACM GIS '08, Article No. 34, Nov. 5-7, 2008, pp. 1-10.

Li, et al., "Multi-Layered Friendship Modeling for Location-Based Social Networks", MobiQuitous '09, Jul. 13-16, 2009, pp. 1-10.

Moussaid, "International Preliminary Report on Patentability issued in International Application No. PCT/US2014/060776", dated Apr. 28, 2016, 7 pages.

Oh, "International Search Report and Written Opinion issued in International Application No. PCT/US2014/060776", dated Jan. 15, 2015, 10 pages.

Sarwat, et al., "Sindbad: A Location-based Social Networking System", SIGMOD '12, May 20-24, 2012, 4 pages.

Shang, et al., "A Random Walk Based Model Incorporating Social Information for Recommendations", IEEE International Workshop on Machine Learning for Signal Processing, Sep. 23-26, 2012, pp. 1-6.

Stevens, "U.S. Office Action issued in copending U.S. Appl. No. 14/054,708, filed Oct. 15, 2013", dated Sep. 22, 2015, 14 pages.

Stevens, "U.S. Office Action issued in copending U.S. Appl. No. 14/054,708, filed Oct. 15, 2013", dated Mar. 22, 2016, 19 pages.

Wilson, et al., "User Interactions in Social Networks and their Implications", EuroSys '09, Apr. 1-3, 2009, pp. 205-218.

Zheng, et al., "Chapter 8: Location-Based Social Networks: Users", Computing with Spatial Trajectories, Springer Science+Business Media LLC, 2011, pp. 243-276.

"Chinese Office Action issued in Chinese Application No. 201480056800.3", dated Nov. 16, 2018.

Heselius, "Extended European Search Report issued in European Application No. 14853453.0", dated Mar. 7, 2017, 9 pages.

Friker, "European Office Action issued in European Application No. 14853453.0", dated Oct. 17, 2017, 7 pages.

"Chinese Office Action issued in Chinese Application No. 201480056800.3 (GOOG-1355CN)", dated Apr. 23, 2019, 08 pages of English Translation and 07 pages of Chinese Office Action.

Heselius "European Decision to Refuse issued in European Application No. 14853453.0 (GOOG-1355EP)", dated May 31, 2019, 16 pages.

* cited by examiner

SOCIAL WHERE NEXT SUGGESTION

CROSS REFERENCE TO RELATED APPLICATIONS

This application is a continuation of and claims priority to U.S. patent application Ser. No. 14/054,708 filed Oct. 15, 2013 and entitled "Social Where Next Suggestion." The complete disclosure of the above-identified priority application is hereby fully incorporated herein by reference.

TECHNICAL FIELD

This disclosure relates to systems and methods for providing a list of destination recommendations to a social group. More particularly, this disclosure describes systems and methods for first identifying a social group based on a combination of location-based signals and social graph information and then providing a group recommendation based at least in part on the personal preference profiles of each member of the social group.

BACKGROUND

When people go out to explore restaurants, pubs, attractions, and recreational venues, they tend to do so in groups. They also tend to report their activity using social network features like posts, photos, and check-ins. After deciding to leave one location, they may want recommendations regarding where to go next. Users desire to obtain a set of recommended destinations on their mobile communication device that not only provide recommendations based on their individual personal preferences but are also based on the personal preferences of other members in their group.

SUMMARY

In certain example embodiments described herein, a method for providing destination recommendations to social groups comprises receiving, at a group recommendation system, a recommendation request from a remote computing device associated with a requesting user, identifying by the system a preliminary social group based on one or more location-based signals received from one or more remote computing devices, identifying those members of the preliminary social group that meet a social connection threshold to define a social group, generating a group recommendation list comprising recommendations for where to go next, and displaying the group recommendation list on the remote computing device of at least the requesting user.

In certain other example embodiments described herein, a system and a computer program product for providing destination recommendations to social groups are provided.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
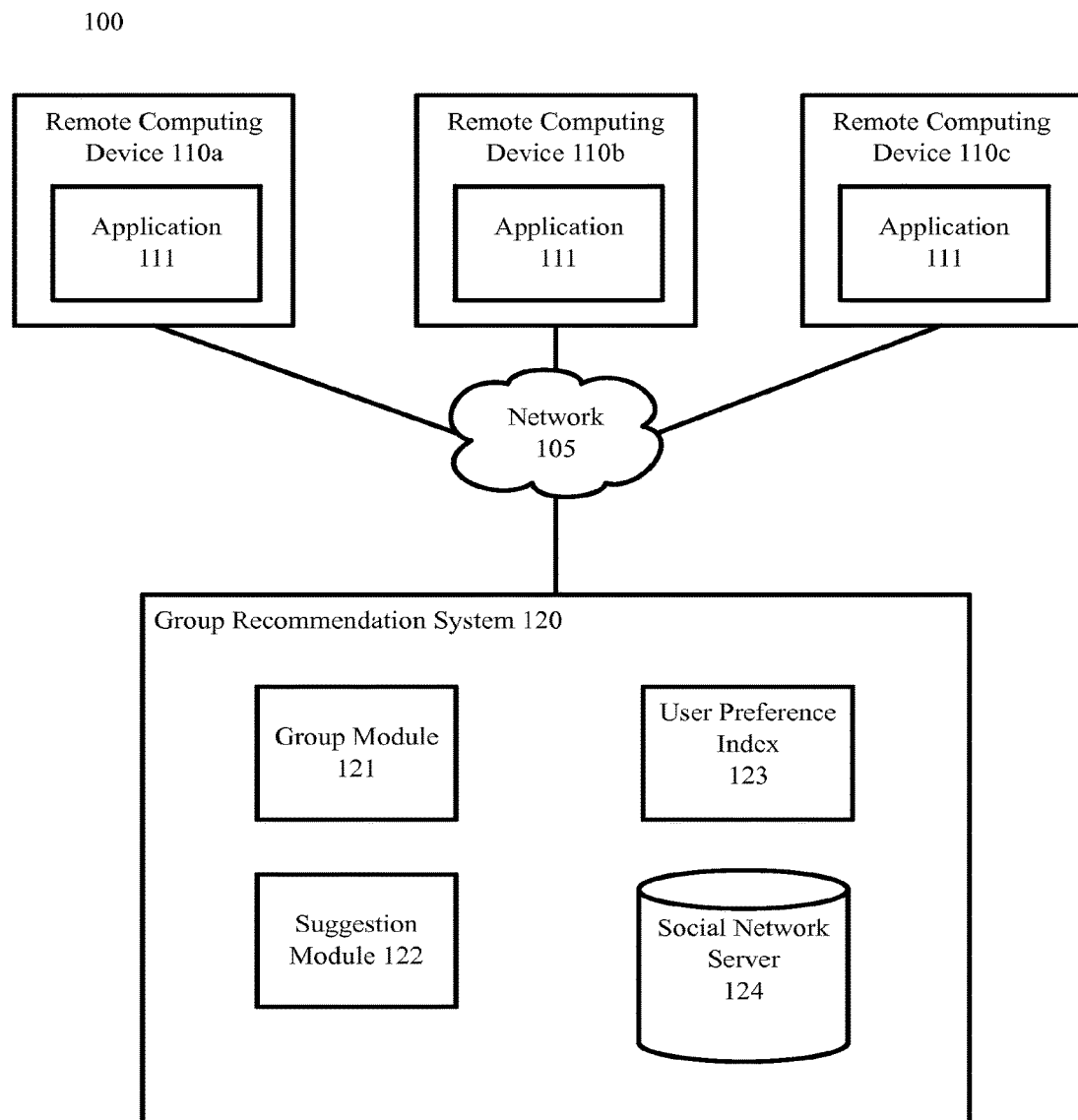
FIG. 1 is a block diagram depicting a system for identifying and providing suggested destinations to members of a social group, in accordance with certain example embodiments.

The embodiments described herein provide a system and method for identifying and providing suggested destinations to members of a social group. For example, a social group may comprise a group of individuals who are at the same location and would like recommendations on where to go next. In certain example embodiments, the system can identify members of the social group based on a combination of location-based signals and social graph information. After the composition of a social group is determined, the system can generate a list of suggested destinations tailored to the group.

Location-based signals that refer to the same location, or within a defined proximity threshold may be used to define a preliminary social group. Location-based signals may only be acquired by the system if the user has given prior permission to share such location-based signals from their remote computing device. For example, the user may set their default preference for sharing location based signals in an account associated with the user and stored on the system. Alternatively, an application executing on the remote computing device may prompt the user to provide permission to share a location-based signal with the system. Location-based signals may be explicit location-based signals, implicit-location based signals, or a combination thereof. Explicit location-based signals may include signals received from a remote computing device associate with a member of a social group, such as the check-in feature available in a social network application. Implicit location-based signals may include signals that are associated with another user's explicit location-based signal. For example, social networking services may allow a user to tag other users when the user checks-in to a location. Alternatively, a user may also tag another user in a photo when uploading the photo to a social network. The tagged user may then be associated with the location of the check-in or photo.

The process for providing a destination recommendation is initiated when the system receives a location-based signal from a mobile computing device associated with a user. The location-based signal provides a current location of the mobile computing device. The user may explicitly initiate a destination recommendation request. Alternatively, the user may elect to allow the mobile computing device to provide updated location information to the system and allow the system to surface destination recommendations automatically. To determine if the user is part of a social group, the system then identifies other users with location-based signals that have been received by the system and that are within a defined proximity and time threshold of the requesting user. For example, the system may look for other users that have checked-in to the same location within a defined time window. In certain example embodiments, the system may look for location-based signals that fit the defined proximity and time thresholds only for users who are within a social connection threshold to the requesting user. For example, the system may look for location-based signals received only from remote computing devices associated with users that are within one step in a social graph of the requesting user. In one example embodiment, each member may be required to have at least one social network connection with every member of the group. In another example embodiment, each member may be required to share at least one common social network connection with at least one other member of the social group, but may have less than a social network connection with every member of the group. For example, a first user and a second user may both have a common social network connection to a third user, but not have a direct social network connection between the first and second users.

After a social group is identified, the system then generates a ranked group recommendation comprising a list of suggested destinations for the group. The ranked group recommendation takes into account the personal preferences of each member of the group. In certain example embodiments, the system may send a verification to the requesting user or all members of the group giving them the option to confirm whether they are members of the same social group. In one example embodiment, the ranked social group recommendation is generated by first generating individual recommendation lists for each user based on a personal profile of each member of the social group. For example, the system may apply a recommendation algorithm to a personal profile associated with each user to generate the individual recommendation list. A group recommendation is then prepared comprising destinations from the individual recommendation lists. For example, the group recommendation may include only destinations that appears on at least two individual recommendation lists. Each recommendation may be ranked according to a composite score. For example, the composite score may be determined by adding together the score that a recommendation received on each individual recommendation list.

In another example embodiment, the system generates the ranked social group recommendation list by merging the personal preference profile of each group member to generate a master preference profile. The same algorithm that is applied to generate individual recommendations is then applied to the master preference profile to generate the ranked group recommendation.

The system then displays the ranked group recommendations on the remote computing device associated with the requesting user. In certain example embodiments, the system may also display the group recommendations on the remote computing devices associated with other members of the group.

Turning now to the drawings, in which like numerals represent like (but not necessarily identical) elements throughout the figures, example embodiments are described in detail.

Example System Architectures

FIG. 1 is a block diagram depicting a system for identifying and providing suggested destinations to members of a social group, in accordance with certain example embodiments. As depicted in FIG. 1, the operating environment 100 includes network computing devices 110*a-c* and 120 that are configured to communicate with one another via one or more networks 105. In some embodiments, a user associated with remote computing devices 110*a-c* must install an application and/or make a feature selection to obtain the benefits of the techniques described herein.

Each network 105 includes a wired or wireless telecommunication means by which network devices (including devices 110*a-c* and 120) can exchange data. For example, each network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device 110*a-c* and 120 includes a device having a communication module capable of transmitting and receiving data over the network 105. For example, each network device 110*a-c* and 120 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices (including devices 110*a-c* and 120) are operated by end-users or consumers (not depicted), and group recommendation system 120 operators (not depicted), respectively.

A user can use an application 111 on the remote computing device 110, such as a web browser application or a stand-alone application, to view, download, upload, or otherwise access documents or web pages via the network 105. The application 111 can interact with web servers or other computing devices connected to the network 105, including the group recommendation system 120.

It will be appreciated that the network connections shown are example and other means of establishing a communications link between the computers and devices can be used. Moreover, those having ordinary skill in the art having the benefit of the present disclosure will appreciate that the remote computing devices 110*a-c* and group recommendation system 120 illustrated in FIG. 1 can have any of several other suitable computer system configurations. For example a remote computing device 110 embodied as a mobile phone or handheld computer may not include all the components described above.

Example Processes

Figure 2:
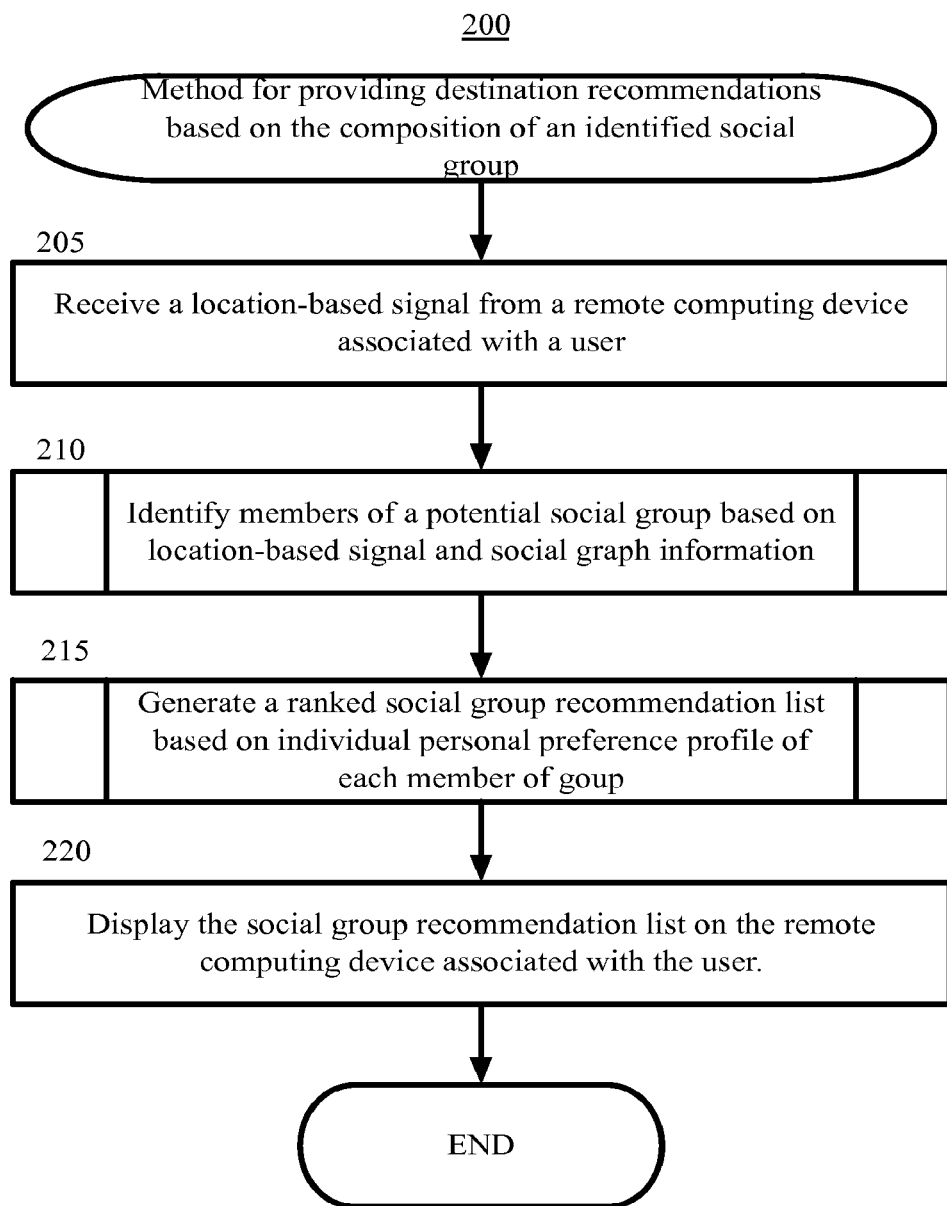
FIG. 2 is a block flow diagram depicting a method to provide destination recommendation based on the composition of an identified social group, in accordance with certain example embodiments.
Figure 3:
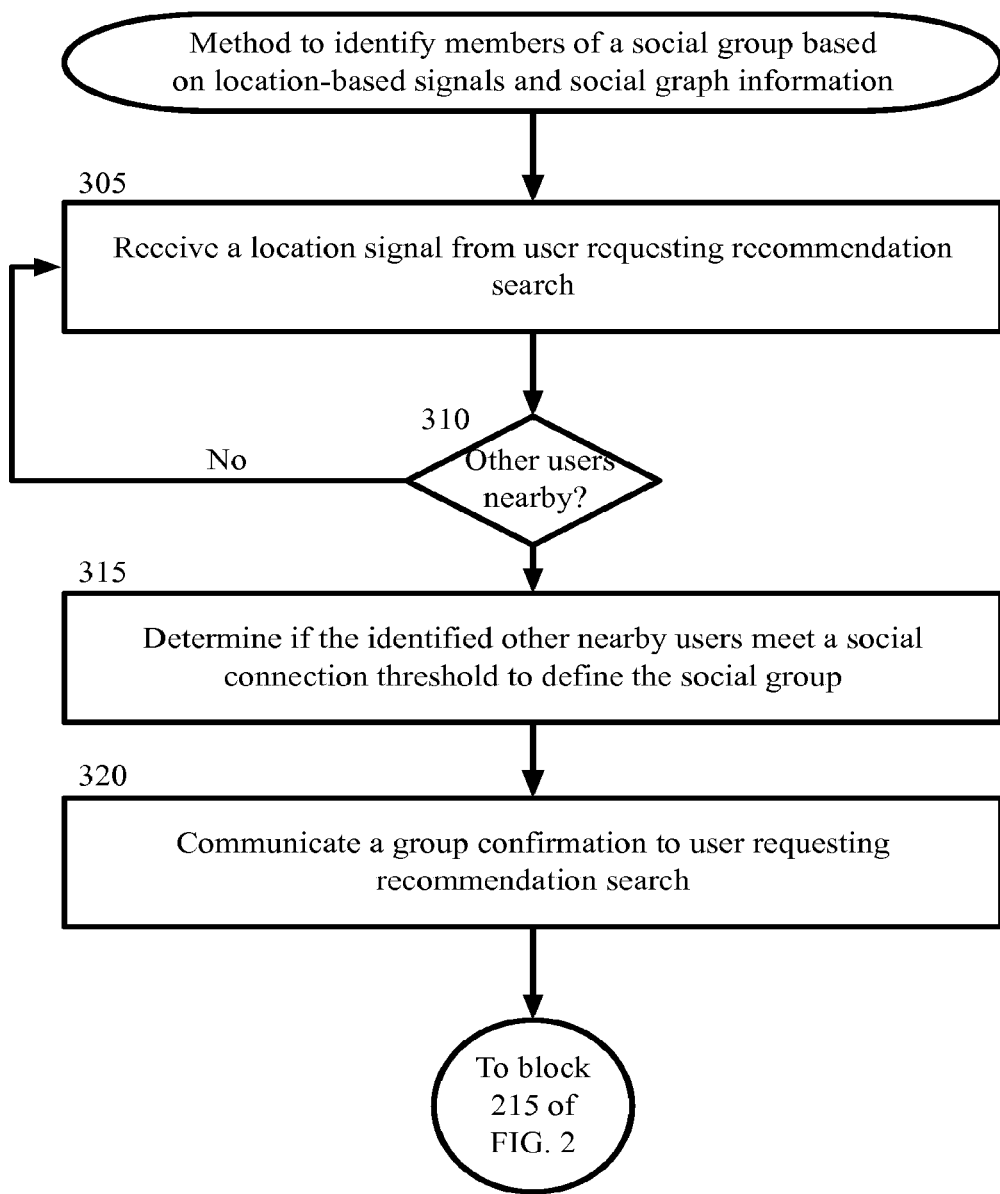
FIG. 3 is a block flow diagram depicting a method to identify members of a social group based on location-based signals and social graph information, in accordance with certain example embodiments.
Figure 4:
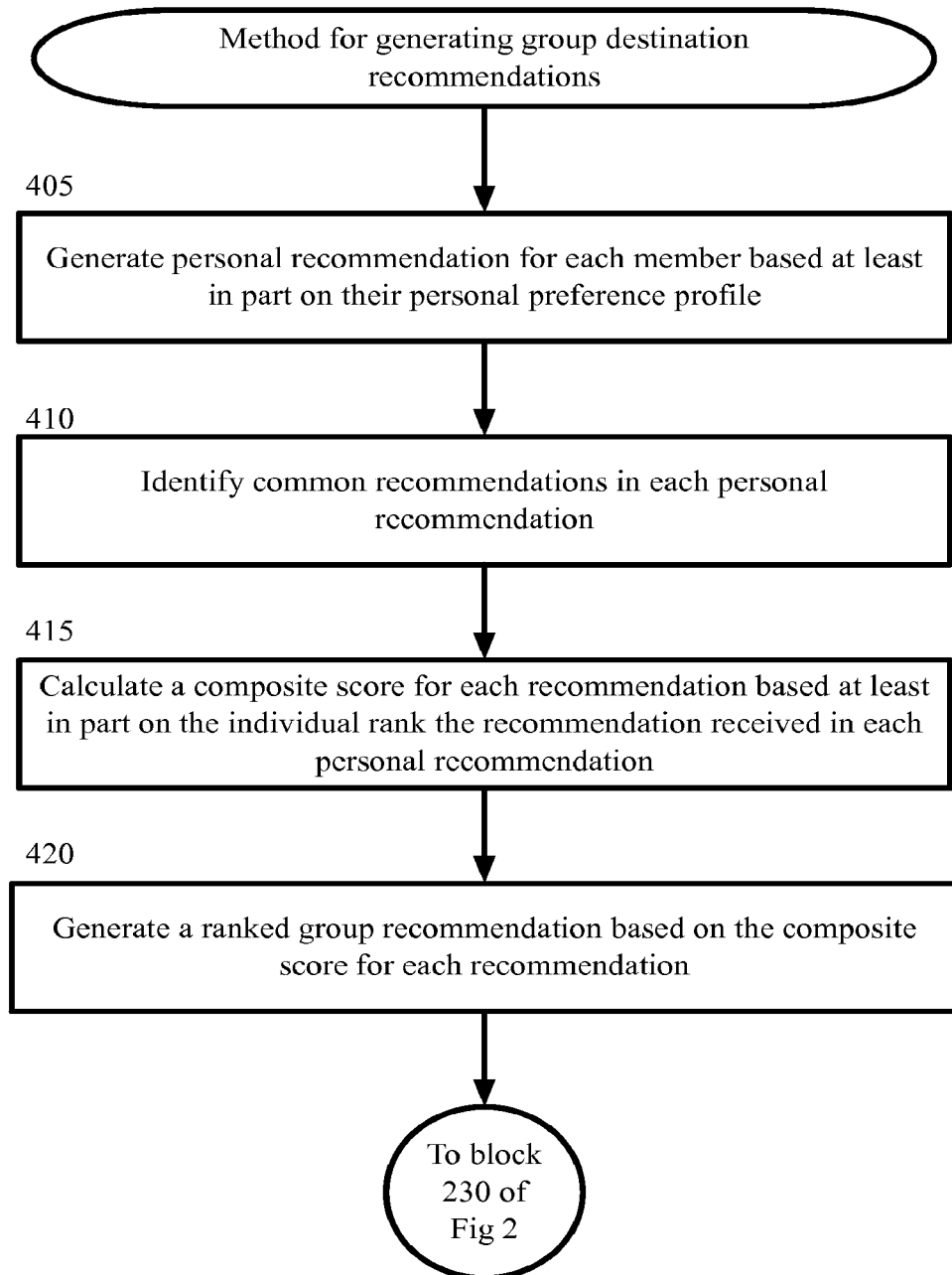
FIG. 4 is a block flow diagram depicting a method to generate group destination recommendations, in accordance with certain example embodiments.

The example methods illustrated in FIG. 2-4 are described hereinafter with respect to the components of the example operating environment 100. The example methods of FIG. 2-4 may also be performed with other systems and in other operating environments.

FIG. 2 is a block flow diagram depicting a method 200 to provide destination recommendations based on the composition of an identified social group, in accordance with certain example embodiments.

Method 200 begins at block 205 where the group module 121 detects a location-based signal from a remote computing device 110*a*. For example, the user may have enabled a location history function on the remote computing device that sends a set of time-stamped GPS coordinates to the group module 121 at regularly timed intervals. In certain example embodiments, the user may communicate a recommendation request to the destination recommendation system. For example, the user may be at a restaurant and may wish to receive a list of suggested destinations on where to go next. The requesting user may have a user account stored in the user preference index 123. The user account stores a user preference profile. The personal preference profile may cover a wide variety of subjects. For example, the user may specify favorite restaurants, by name or type, favorite neighborhoods, favorite retailers, a preferred price range, and preferred attractions or concerts, among other items. A user may also score or weight how important a given factor in the personal profile is to the recommendations they would like to see. For example, a user may specify that a particular type of restaurant in a particular neighborhood is a more important factor than price. In certain example embodiments, a user's personal preferences may be inferred from behavior of the user on the system or related applications. For example, a personal preference for a particular restaurant may be inferred from repeated check-ins at the same location, the writing of a review after visiting a given location, or bookmarking of locations. The request for a destination recommendation may include a general request for all recommended suggestions, or the request may specify certain categories of destinations such as a theater, a museum, or a bar.

At block 210, the suggestion module 121 determines whether the user is part of a social group by identifying other potential members of the social group based on location-based signals and social graph information. Block 210 will be described in further detail with reference to FIG. 3 below.

FIG. 3 is a block flow diagram depicting a method 210 to identify members of a social group, in accordance with certain example embodiments. Method 210 begins at block 305, where the group module 121 receives a location-based signal from the remote computing device 110*a*. In certain example embodiments, the location-based signal may be included in the destination recommendation request discussed above in reference to block 205. In certain other example embodiments, the suggestion module 122 may communicate a request to provide current location information to the remote computing device 110*a* in response to receiving the destination recommendation request. The location-based signals may include an explicit location-based signal received from the remote computing device 110*a*, such as a GPS location from a GPS application of the remote computing device 110*a* or the check-in feature available in a social network application. In other example embodiments, the application 111 may request location data from an operating system of the remote computing device 110*a*. Access to and transmission of location-based signals by the application 111 may only be performed with prior consent from the user.

At block 310, the group module 121 uses the location information included in the location-based signal received from the remote computing device 110*a* to determine if other users associated with other remote computing devices 110, for example remote computing devices 110*b-c*, are nearby. The group module 121 may use a predetermined proximity threshold to determine if location-based signals from other remote computing devices 110*b-c* are within the predetermined proximity threshold. In certain example embodiments, the proximity threshold may require the other remote computing devices 110*b-c* to be checked-in to the same location as remote computing device 110*a*. In other example embodiments, the proximity threshold may define a distance threshold that the remote computing devices 110*b-c* have to be within to be considered nearby. The distance threshold can be calibrated based on the time or location of the remote computing device 110*a*. For example, if remote computing device 110*a* is at a restaurant the distance threshold may be relatively small, for example within 50 feet and the time threshold relatively low, for example, the typical time it would take to complete a meal. If the remote computing device 110*a* is checked in at a theme park or multi-venue sporting or music event that spans several acres, the distance threshold may be defined in hundreds or thousands of feet and the time threshold may be expanded.

The location-based signals may be explicit. For example, a location-based signal, such as a check-in, is received directly from the mobile computing device associated with the user. The location-based signal may also include implicit location-based signals. For example, social networking services allow a user to tag other users in their social network when the user checks-in to a location. Alternatively, a user may also tag another user in a photo when uploading the photo to a social network. A photo may have GPS and time metadata associated with it by the camera application that took the photo. A photo may also be associated with a location when the photo is attached to a check-in at a given location. The photo does not have to be taken by a member of the social group. A photo that associates a potential member of the social group with the location of the requesting user or preliminary social group can be taken by a user who is not included in the social group. In certain example embodiments, the group module 121 may require the implicit-location signal to be within a defined time threshold. For example, if a user has been tagged in a photo, the group module 121 may determine that the tag was added within a defined time threshold to ensure the tag was a recent tag and thereby increase the likelihood the tagged user is at the same location as the preliminary social group. In certain example embodiments, the group module 121 may also determine the date and time of the upload of the photo and exclude any photos outside the time threshold even if the potential social group member has been tagged by a current social group member.

If the group module 121 determines that other users associated with other remote computing devices 110*b-c* are nearby, then the method proceeds to block 315. If the group module 121 does not determine that remote computing devices 110*b-c* are nearby, then the method returns to block 305 and waits to receive a location-based signal from a user requesting a recommendation search. In certain other example embodiments, the system may proceed instead to provide an individual destination recommendation to the requesting user, for example, as described below in reference to block 405.

In block 315, the group module 121 uses social graph information associated with the requesting user to select those users identified in block 310 above that also meet a predetermined social connection threshold. The users that meet the social connection threshold define a final social group. For example, the group module 121 may identify only those users that have a direct connection to the requesting user. In other example embodiments, the group module 121 may include users that are within a defined number of steps on the requesting user's social graph. In other example embodiments, the group module 121 may include users that are not connected to the requesting user but are directly connected to a second user that is in turn directly connected to the requesting user. In yet other example embodiments, the group module 121 may include users that have a defined number of users in common in their respective social graphs.

The group module 121 may communicate a request to remote computing device 110a to access the social graph information of the requesting user, for example by requesting the user login in to their social network account, wherein the login authorizes a social network server 124 to share social graph information with the group module 121. In certain example embodiments, the social network server 124 may be part of the group recommendation system 120 and accessed by the same user account login.

In another example embodiment, the group module 121 first identifies all users for which the group module 121 has received location-based information and determines if any remote computing device 110 is within the defined proximity threshold. For example, the group module 121 may store location-based information in a data structure for a defined period of time. For example, the group module 121 may time stamp a location-based signal and store the remote computing device 110 location information from the location-based signal in an index, where the index deletes the stored location information at a set time interval. The suggestion module 121 then determines if any of the identified remote computing devices 110 meet the social connection threshold.

In certain example embodiments, the group module 121 may first perform block 315 to identify those users that meet the social connection threshold, and then define the social group by determining if a location-based signal has been received for one or more of those users as described in block 310 above.

At block 320, the group module 121 may communicate a social group confirmation to one or more members of the identified social group. For example the social group confirmation may only be communicated to the requesting user, or may be communicated to each member of the group. A user may then confirm they are a member of the social group or opt out of being included in the social group. The method then proceeds to block 215 of FIG. 2.

Returning to block 215 of FIG. 2, the suggestion module 122 generates a ranked destination recommendation list based on the personal preference profiles of each member of the group. Block 215 is described in further detail hereinafter with reference to FIG. 4.

FIG. 4 is a block flow diagram depicting a method 215 to generate ranked destination recommendations based on the personal preference profiles of each member of the social group, in accordance with certain example embodiments.

Method 215 begins at block 405, where the suggestion module 122 generates a personal recommendation for each member based at least in part on each user's personal preference profile. For example, the suggestion module 122 may access a user preference profile index 123. For each registered user of the system 120, the user preference profile index 123 stores a preference profile. The preference profile may be created by the user when the user registers with the group recommendation system 120 as referenced in block 205 above, or may be obtained from an associated non-group-based recommendation system. In certain example embodiments, the group recommendation system 120 provides individual as well as group-based recommendations. In certain example embodiments, a user's personal preferences may be inferred from behavior of the user on the system or related applications. For example, a personal preference for a particular restaurant may be inferred from repeated check-ins at the same location, the writing of a review after visiting a given location, or bookmarking of locations. The preferences in a preference profile are used to focus the recommendation for that user and to emphasize or highlight results that match the personal preference profile.

In certain example embodiments, the group recommendation system 120 generates a list of recommendations for a user based on their personal profile using a recommendation ranking algorithm. In certain example embodiments, the recommendation ranking algorithm generates a list of recommendations for the user with a score for each recommendation based on how closely the recommendation matches one or more criteria of the personal preference profile. The recommendations may be ranked or given a score value. For example, a recommendation that matches multiple criteria in a user's preference profile may be given a higher score than a recommendation that matches on a single criteria in a user's preference profile. The suggestion module 122 generates a personal recommendation list for each member of the social group.

At block 410, the suggestion module 122 calculates a composite score for each recommendation based, at least in part, on the individual rank the recommendation received in each personal recommendation list. For example, the suggestion module 122 may identify common recommendations that occur in multiple personal recommendation lists and calculate a composite score for that recommendation. In certain example embodiments, the composite recommendation may be calculated by adding the rank or score value each recommendation list achieved on each personal recommendation list. For example, if recommendation A had a score of 10 on user A's personal recommendation list, a score of 5 on user B's personal recommendation list, and a score of 7 on user C's personal recommendation list, the composite score would be 22. In certain other example embodiments, the composite score is calculated by multiplying the scores assigned to a common recommendation on multiple personal recommendation list.

At block 420, the suggestion module 122 then generates a ranked group recommendation list based on at least the calculated composite score for each recommendation. For example, the suggestion module 122 may generate a ranked recommendation list with the recommendations ranked from highest to lowest based on the composite score of each recommendation.

In an alternative example embodiment, the individual personal profiles of each member of the group are first merged into a group recommendation profile. For example, in a social group comprising group members A, B, and C, the suggestion module will merge the personal profiles of group members A, B, and C into a single group suggestion profile. The suggestion module 122 then applies the same ranking algorithm used for individual recommendation list to generate a group recommendation list. The method 215 then proceeds to block 220 of FIG. 2.

Returning to block 220 of FIG. 2, the suggestion module 122 communicates the group recommendation list to the remote computing device 110a for display on the remote computing device 110a. For example, the group recommendation list may be displayed to the requesting user on the remote computing device 110a via the application 111. In certain example embodiments, the group recommendation list is communicated to all members of the social group via the remote computing devices 110b, 110c or other remote computing devices 110. In certain other example embodiments, the group recommendation list may be communicated to the other users in the social group from remote computing device 110a. For example, the requesting user may share the group recommendation list with other members of the social group by communicating the group recommendation list to the remote computing devices 110 associated with the other members using NFC or other suitable communication medium.

Other Example Embodiments

Figure 5:
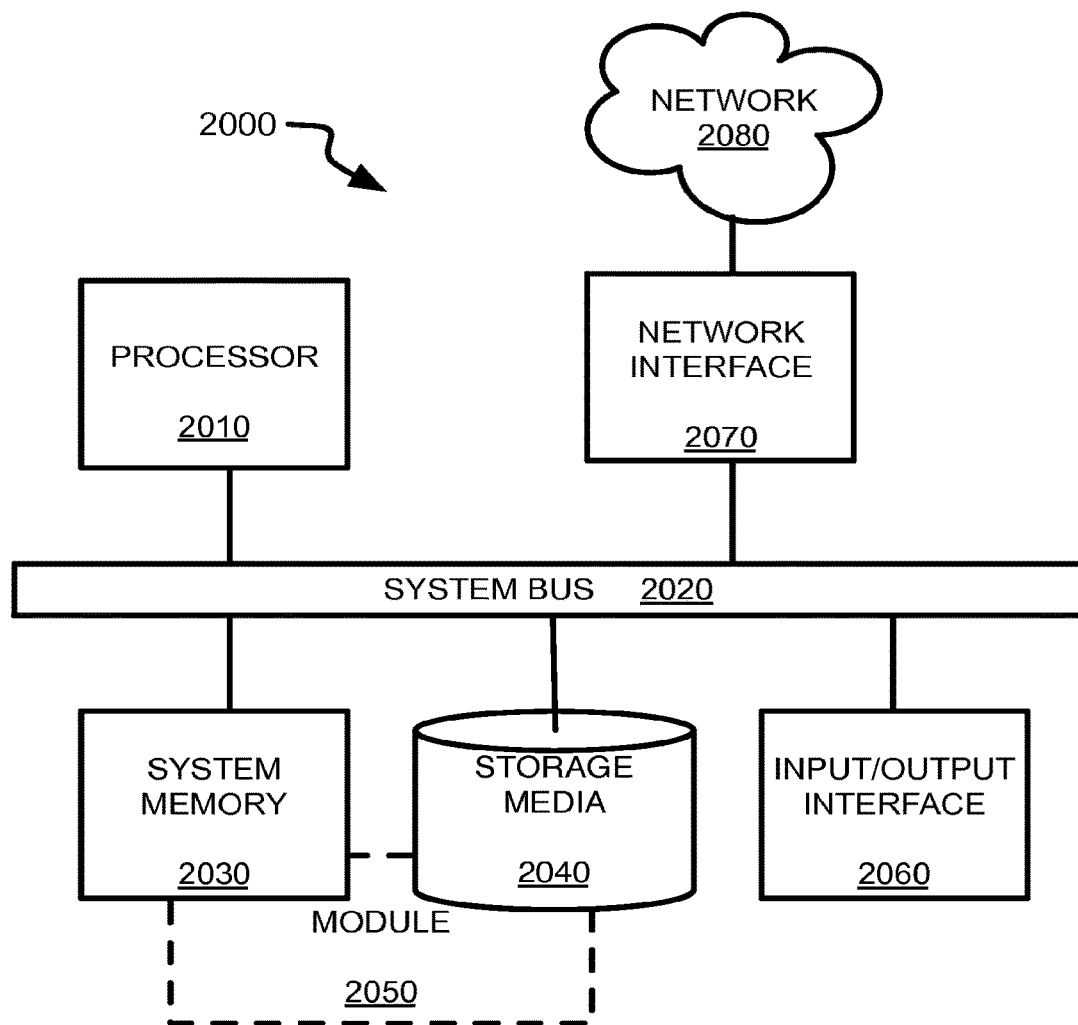
FIG. 5 is a block diagram depicting a computing machine and a module, in accordance with certain example embodiments.

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to provide destination recommendations to social groups, comprising:

receiving, by one or more computing devices, a group recommendation request from a first remote computing device associated with a requesting user, the group recommendation request comprising a current location of the requesting user and a request for a next destination based in part on the current location of the requesting user;

identifying, by the one or more computing devices, a social group, the social group identified based on one or more location signals received from one or more remote computing devices indicating that the remote computing devices are within a defined proximity threshold of the current location of the requesting user and that the two or more location signals were generated within a defined time threshold of the group recommendation request, the social group further identified based on identification of common social connection information;

generating, by the one or more computing devices, a group recommendation list for the social group, the group recommendation list comprising a list of suggested destinations for the group based at least in part on personal preference profiles of each member of the social group; and displaying, by the one or more computing devices, the group recommendation on the first remote computing device.

2. The method of claim 1, wherein generating a group recommendation list comprises:

determining, by the one or more computing devices, an individual recommendation list for each member of the social group, the individual recommendation list for each particular member comprising one or more destination recommendations based at least in part on a personal preference profile of the particular member;

identifying, by the one or more computing devices, a set of common recommendations that appear in more than one individual recommendation list;

determining, by the one or more computing devices, a composite score for each identified common recommendation, wherein the composite score is based at least in part on a ranking of each common recommendation in the corresponding individual recommendation lists; and generating, by the one or more computing devices, the group recommendation list based on the composite score assigned to each identified common recommendation.

3. The method of claim 1, wherein generating a group recommendation list comprises:

generating, by the one or more computing devices, a master preference profile for the social group based at least in part on a combination of the personal preference profiles of each member of the social group; and generating, by the one or more computing devices, a social group recommendation list based at least in part on the master preference profile.

4. The method of claim 1, further comprising:

communicating, by the one or more computing devices, a social group confirmation request to the first remote computing device prior to generating the social group recommendation list, the social group confirmation request identifying potential members for the social group; and receiving, by the one or more computing devices, a social group confirmation from the first remote computing device confirming which of the potential members to include in the social group.

5. The method of claim 1, wherein the one or more location signals comprises a check-in location signal received from a remote computing device associated with a member of the social group.

6. The method of claim 1, wherein the one or more location signals comprises a tag signal.

7. The method of claim 6, wherein the tag signal is associated with the check-in signal of the first member of the social group, or a photo taken within the proximity threshold.

8. A computer program product, comprising:

a non-transitory computer-executable storage device having computer-executable program instructions embodied thereon that when executed by a computer cause the computer to provide destination recommendations to social groups, the computer-executable program instructions comprising:

computer-executable program instructions to receive a recommendation request from a remote computing device associated with a requesting user, the group recommendation request comprising a current location of the requesting user;

computer-executable program instructions to identify one or more users that are within a social connection threshold;

computer-executable program instructions to identify the one or more users that are within the social connection threshold that are also within a defined proximity threshold of the current location of the requesting user based on one or more location-based signals received from one or more remote computing devices associated with the one or more users to define a social group;

computer-executable program instructions to generate a group recommendation list for the social group, the group recommendation list comprising a list of suggested destinations for the group based at least in part on the personal preferences of each member of the social group; and computer-executable program instructions to display the social group recommendation on the first remote computing device.

9. The computer program product of claim 8, wherein generating a social group recommendation list comprises:

computer-executable program instructions to determine a individual recommendation list for each member of the social group, the individual recommendation list for each particular member comprising one or more destination recommendations based at least in part on a personal preference profile of the particular member;

computer-executable program instructions to identify a set of common recommendations that appear in more than one individual recommendation list;

computer-executable program instructions to determine a composite score for each identified common recommendation; and computer-executable program instructions to generate the group recommendation list based on the composite score assigned to each identified common recommendation.

10. The computer program product of claim 8, wherein generating a group recommendation list comprises:

computer-executable program instructions to generate a master preference profile for the social group based at least in part on the combined personal preference profiles of each member of the social group; and computer-executable program instructions to generate a social group recommendation list based at least in part on the master preference profile.

11. The computer program product of claim 8, wherein the one or more location signals is a tag signal.

12. The computer program product of claim 11, wherein the tag signal is associated a check-in signal or a photo taken within the defined proximity threshold.

13. A system to provide destination recommendations to social groups, comprising:

a storage device; and a processor communicatively coupled to the storage device, wherein the processor executes application code instructions that are stored in the storage device to cause the system to:

identify a social group based on one or more location-based signals received from a first remote computing device associated with a requesting user, other remote computing devices associated with one or more other users, or a combination thereof, the one ore more location signals indicating the remote computing devices are within a defined proximity threshold to the first remote computing device and that the one or more location signals were generated within a define time threshold to the generation of a current one of the one or more location-based signals received from the first computing device, the social group further identified based on identification of common social connection information;

generate a group recommendation list for the social group, the group recommendation list comprising a list of suggested destinations for the group based at least in part on the personal preferences of each member of the social group; and display the social group recommendation on the first remote computing device.

14. The system of claim 13, wherein generating a group recommendation list further comprises executing application code instructions that cause the system to:

determine an individual recommendation list for each member of the social group, the individual recommendation list for each particular member comprising one or more ranked destination recommendations based at least in part on a personal preference profile of the particular member;

identify a set of common recommendations that appear in more than one individual recommendation list;

determine a composite score for each identified common recommendation; and generate the group recommendation list based on the composite score assigned to each identified common recommendation.

15. The system of claim 13, wherein generating a group recommendation list further comprises executing application code instructions that cause the system to:

generate a master preference profile for the social group based at least in part on the combined personal preference profiles of each member of the social group; and generate a social group recommendation list based at least in part on the master preference profile.

16. The system of claim 13, wherein the one or more location signals is a check-in location signal received from a remote computing device associated with a member of the social group.

17. The system of claim 13, wherein the one or more location signals is a tag signal.

18. The system of claim 17, wherein the tag signal is associated with a check-in signal, or a photo taken within the defined proximity threshold.

* * * * *